US012665805B2

(12) United States Patent
Báder et al.

(10) Patent No.: US 12,665,805 B2
(45) Date of Patent: Jun. 23, 2026

(54) TECHNIQUE FOR SETTING A DECISION THRESHOLD OF A COMMUNICATION NETWORK ANALYTICS SYSTEM

(71) Applicant: Telefonaktiebolaget LM Ericsson (publ), Stockholm (SE)

(72) Inventors: Attila Báder, Paty (HU); Alexander Biro, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/730,315

(22) PCT Filed: Jan. 28, 2022

(86) PCT No.: PCT/EP2022/052000
§ 371 (c)(1),
(2) Date: Jul. 19, 2024

(87) PCT Pub. No.: WO2023/143725
PCT Pub. Date: Aug. 3, 2023

(65) Prior Publication Data
US 2025/0150322 A1      May 8, 2025

(51) Int. Cl.
H04L 41/0631 (2022.01)
H04L 41/142 (2022.01)

(52) U.S. Cl.
CPC ........ H04L 41/0631 (2013.01); H04L 41/142 (2013.01)

(58) Field of Classification Search
CPC .............. H04L 41/0631; H04L 41/142; H04L 41/5009
See application file for complete search history.

(56) References Cited

U.S. PATENT DOCUMENTS

| | | | | |
|---|---|---|---|---|
| 2017/0094537 A1* | 3/2017 | Yang | ................... | H04L 41/0631 |
| 2017/0134237 A1* | 5/2017 | Yang | ................... | H04L 41/0897 |

(Continued)

OTHER PUBLICATIONS

International Search Report and Written Opinion issued for PCT/EP2022/052000 mailed on Jan. 28, 2022.

(Continued)

*Primary Examiner* — Philip C Lee
(74) *Attorney, Agent, or Firm* — Sonoda & Kobayashi Intellectual Property Law; Sarvajit S. Patil

(57) ABSTRACT

A technique of setting one or more decision thresholds of a network analytics system is presented. The analytics system is configured to analyze statistics pertaining to a service quality-related (SQR) parameter acquired for a communication network and statistics pertaining to a root cause-related (RCR) parameter acquired for the communication network, wherein the SQR parameter correlates with the RCR parameter. A first parameter is defined to be one of the SQR parameter and the RCR parameter and a second parameter is defined to be the other of the SQR parameter and the RCR parameter. A method realization of the technique presented herein comprises obtaining first statistics for the first parameter in situations in which the second parameter assumes critical second parameter values, obtaining second statistics for the first parameter in situations in which the second parameter assumes non-critical second parameter values, and setting a first decision threshold of the analytics system.

19 Claims, 14 Drawing Sheets

300

Obtain first statistics for a first parameter in situations in which a second parameter assumes critical second parameter values

302

Obtain second statistics for the first parameter in situations in which the second parameter assumes non-critical second parameter values

304

Set decision threshold based on an analysis of the first statistics and the second statistics, wherein the decision threshold is defined to separate critical from non-critical first parameter values

306

(56) References Cited

U.S. PATENT DOCUMENTS

| | | | | |
|---|---|---|---|---|
| 2017/0364819 | A1* | 12/2017 | Yang | H04L 41/16 |
| 2020/0029240 | A1* | 1/2020 | Li | H04W 24/02 |

OTHER PUBLICATIONS

Qin Wu Huawei China: "Draft new Recommendation E.FINAD "Guidelines for Intelligent Network Analytics and Diagnostics"; TD659R3"", ITU-T DRAFT; Study Period 2017-2020; Study Group 12; Series TD659R3, International Telecommunication Union, Geneva; CH, vol. 1/12, Dec. 4, 2018, pp. 1-37, XP044254482.

Kaloxylos Alexandros et al., "AI and ML—Enablers for Beyond 5G Networks", Version 1.0, May 11, 2021, XP055906766, DOI 10.5281/ zenodo.4299895, URL: https://5g-ppp.eu/wp-content/uploads/2021/ 05/AI-MLforNetworks-v1-0.pdf.

Sina Gholamian et al., "A Comprehensive Survey of Logging in Software: From Logging Statements Automation to Log Mining and Analysis", arxiv.org, Cornell University Library, 201 Olin Library Cornell University Ithaca, NY 14853, Oct. 24, 2021, XP091081231.

"Network Functions Virtualisation (NFV); Assurance; Report on Active Monitoring and Failure Detection", ETSI DRAFT; ETSI GS NFV-REL 004, European Telecommunications Standards Institute (ETSI), 6650 Route des Lucioles; F-06921 Sophia Antipolis Cedex— France, vol. ISG-NFV, No. V-REL 004 V1.1.1, Sep. 1, 2017, pp. 1-61, XP014311792, https://www.etsi.org/deliver/etsi_gs/nfv-rel/ 001_099/004/01.01.01_60/gs_nfv-rel004v010101p.pdf.

* cited by examiner

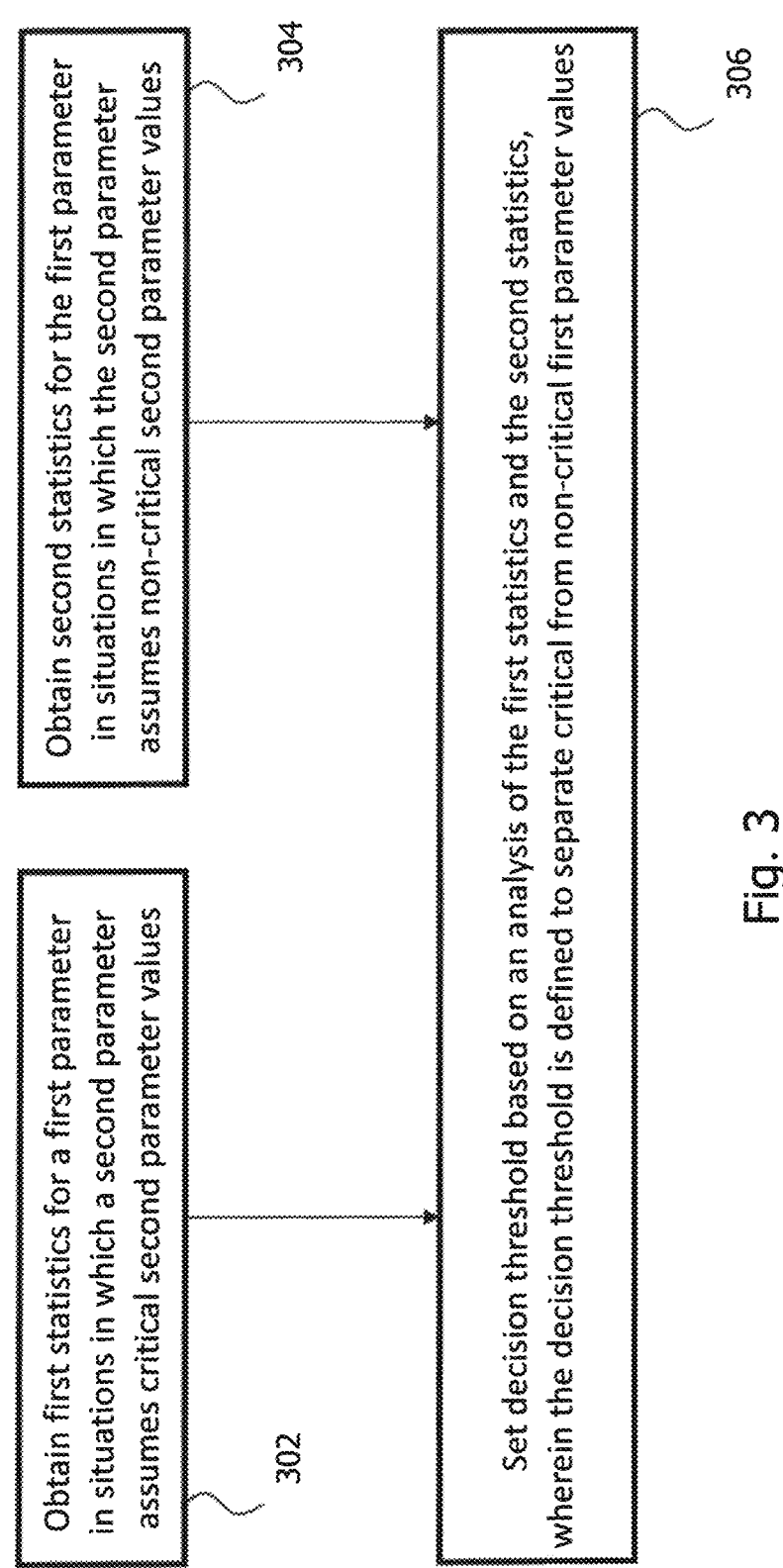

300

Obtain first statistics for a first parameter in situations in which a second parameter assumes critical second parameter values

302

Obtain second statistics for the first parameter in situations in which the second parameter assumes non-critical second parameter values

304

Set decision threshold based on an analysis of the first statistics and the second statistics, wherein the decision threshold is defined to separate critical from non-critical first parameter values

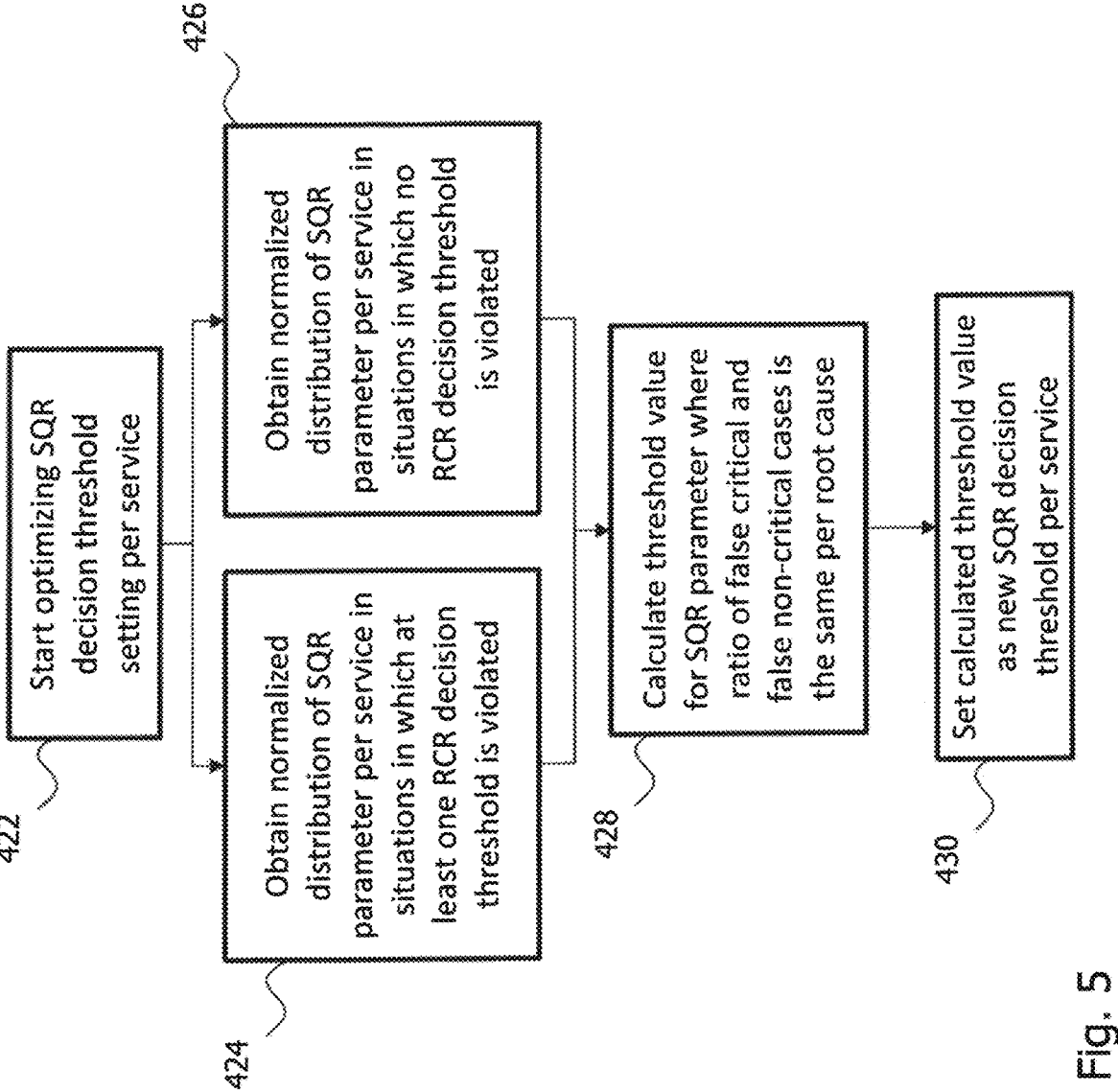

420

422

Start optimizing SQR decision threshold setting per service

426

Obtain normalized distribution of SQR parameter per service in situations in which no RCR decision threshold is violated

424

Obtain normalized distribution of SQR parameter per service in situations in which at least one RCR decision threshold is violated

428

Calculate threshold value for SQR parameter where ratio of false critical and false non-critical cases is the same per root cause

430

Set calculated threshold value as new SQR decision threshold per service

Fig. 5

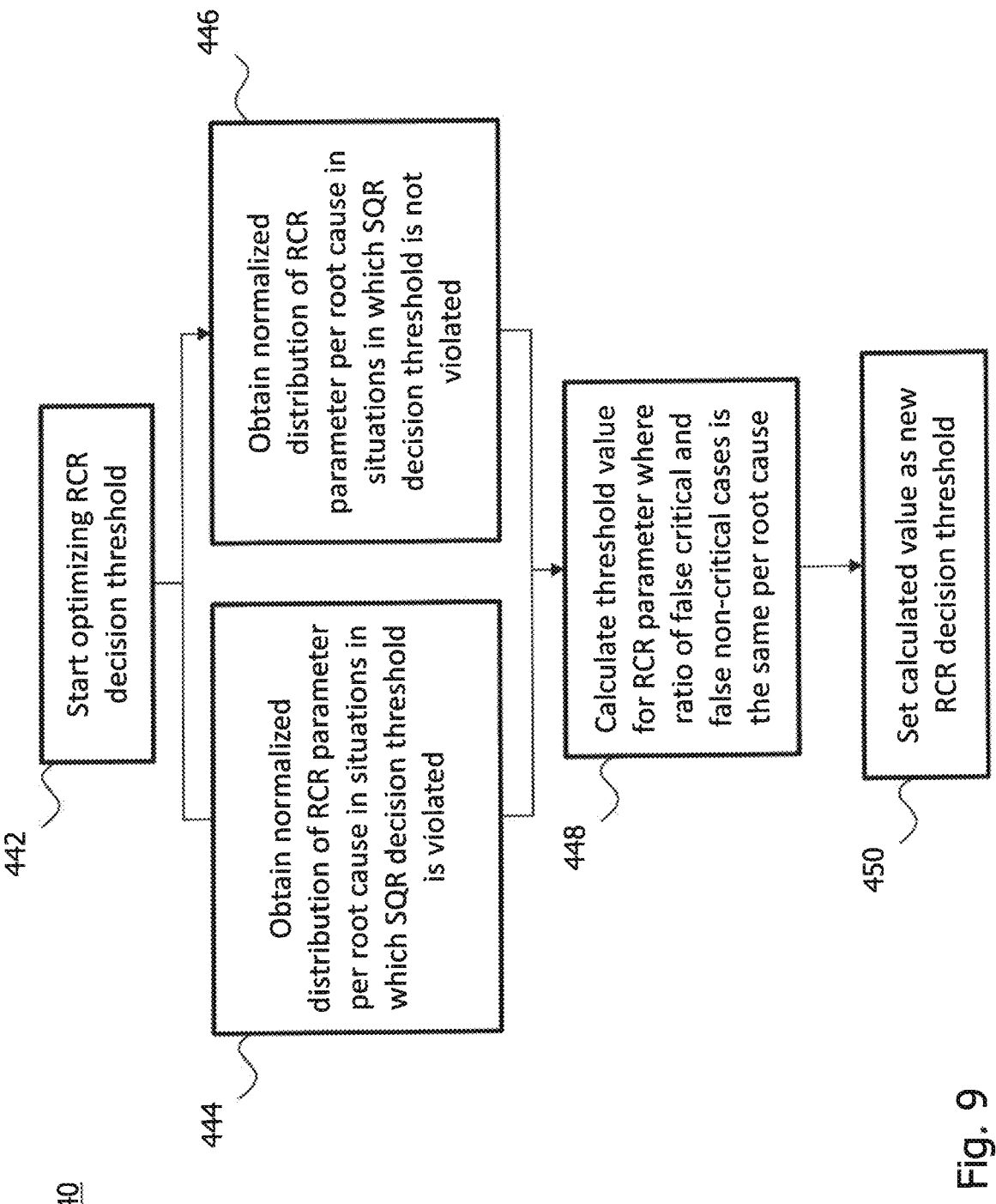

440

442   Start optimizing RCR decision threshold

446   Obtain normalized distribution of RCR parameter per root cause in situations in which SQR decision threshold is not violated 444   Obtain normalized distribution of RCR parameter per root cause in situations in which SQR decision threshold is violated 448   Calculate threshold value for RCR parameter where ratio of false critical and false non-critical cases is the same per root cause 450   Set calculated value as new RCR decision threshold

Fig. 9

TECHNIQUE FOR SETTING A DECISION THRESHOLD OF A COMMUNICATION NETWORK ANALYTICS SYSTEM

CROSS-REFERENCE TO RELATED APPLICATIONS

This patent application is a submission under 35 U.S.C. § 371 for U.S. national stage patent application of international application no. PCT/EP2022/052000 filed on Jan. 28, 2022 and entitled "TECHNIQUE FOR SETTING A DECISION THRESHOLD OF A COMMUNICATION NETWORK ANALYTICS SYSTEM," the entirety of which is incorporated herein by reference.

TECHNICAL FIELD

The present disclosure generally relates to communication networks and associated network analytics. In particular, a technique for setting one or more decision thresholds of a network analytics system is presented. The technique may be implemented as a method, a computer program product, an apparatus or a system.

BACKGROUND

In modern communication networks, network analytics systems are part of a so-called network management domain and used to analyze service quality and other network-related aspects. Network analytics systems are used by different operational groups, such as network operation centers (NOCs), service operation centers (SOCs), and network optimization engineering (including network performance management).

Advanced analytics systems, such as the Ericsson Expert Analytics (EEA), collect and correlate elementary network events as well as end-to-end (e2e) service quality metrics and compute e2e key performance indicators (KPIs) therefrom. These types of analytics systems are configurable to associate service quality degradations with network-related issues for root cause detection.

Fast reaction times in the network management domain require real-time analytics systems configured for real-time collection and correlation of characteristic network events. Besides powerful data collection and correlation functions capable of handling the resulting amount of information in real-time, analytics systems also require advanced database technologies, sophisticated information processing engines and "big data" analytics processing capabilities. The amount of network events, especially those containing detailed user plane metrics, is large. For example, the event rate can be in the order of one or more Gbit/s for a larger communication network.

A challenge resides in the fact that service quality-related issues are not specifically detected (and reported) by network nodes or other network elements. As such, they cannot immediately (e.g., without further analysis and, optionally, preceding data correlation, aggregation or enrichment) be detected by a performance management system.

In order to efficiently detect service quality-related issues and identify the root cause for a large number of communication sessions, mobile network operators (MNOs) often implement rules in their analytics systems. The rules are typically based on expert knowledge and generate incidents if, for example, a service KPI degradation is detected. The incidents then prompt a root cause analysis.

A primary trigger for root cause identification is usually a network failure event or a service KPI degradation, which is followed by an evaluation of a number of further KPIs and message sequences in order to enable identification of a possible root cause of the issue. Associated incidents appear in a network performance management system, where they are prioritized and handed over to network operation engineering teams for fixing the root cause.

Although rule-based incident detection is very efficient, developing rules and finding appropriate parameters for the rules, such as decision thresholds, requires complex laboratory and drive tests, appropriate test equipment, and sophisticated data evaluation techniques. For this reason, it is time consuming and costly to arrive at a set of reliable rules.

Today, the rules are often developed and provided by network equipment vendors, who typically do not have access to "real" data from "live" networks. Therefore, the vendor-supplied rules are based on test system measurements and expert knowledge. "Live" network conditions, however, are typically different, and the vendor-supplied rules often do not take into account MNO-specific network settings. Therefore, rule optimization has to be performed repeatedly by each individual MNO, which is a cumbersome task.

Rules that are based on explicit network failure triggers and well-defined (standard) message sequences and cause codes can be considered highly reliable. On the other hand, rules which are based on KPIs and, in particular, KPI threshold settings are less reliable, since both KPI measurements and the applied decision thresholds inherently include uncertainties. Therefore, these rules are less reliable. In particular, these rules are prone to generating false incidents, which may result in identifying a false root cause and triggering an unnecessary network performance action. Moreover, at the same time there will be network issues for which incidents are not generated.

SUMMARY

Accordingly, there is a need for a technique of improving a network analytics system to avoid one more of the above, or other, drawbacks.

According to a first aspect, a method of setting one or more decision thresholds of a network analytics system is provided. The analytics system is configured to analyze statistics pertaining to a service quality-related (SQR) parameter acquired for a communication network and statistics pertaining to a root cause-related (RCR) parameter acquired for the communication network, wherein the SQR parameter correlates with the RCR parameter. A first parameter is defined to be one of the SQR parameter and the RCR parameter and a second parameter is defined to be the other of the SQR parameter and the RCR parameter. The method comprises obtaining first statistics for the first parameter in situations in which the second parameter assumes critical second parameter values, and obtaining second statistics for the first parameter in situations in which the second parameter assumes non-critical second parameter values. The method further comprises setting a first decision threshold of the analytics system based on an analysis of the first statistics and the second statistics, wherein the first decision threshold is defined to separate critical from non-critical first parameter values.

Also provided is a computer program product configured to perform the steps of any of the methods presented herein when the computer program product is executed one or more processors. The computer program product may be stored on a computer-readable recording medium.

A second aspect of the present disclosure relates to an apparatus for setting one or more decision thresholds of a network analytics system. The analytics system is configured to analyze statistics pertaining to an SQR parameter acquired for a communication network and statistics pertaining to an RCR parameter acquired for the communication network, wherein the SQR parameter correlates with the RCR parameter. A first parameter is defined to be one of the SQR parameter and the RCR parameter and a second parameter is defined to be the other of the SQR parameter and the RCR parameter. The apparatus is configured to obtain first statistics for the first parameter in situations in which the second parameter assumes critical second parameter values, and to obtain second statistics for the first parameter in situations in which the second parameter assumes non-critical second parameter values. The apparatus is further configured to set a first decision threshold of the analytics system based on an analysis of the first statistics and the second statistics, wherein the first decision threshold is defined to separate critical from non-critical first parameter values.

The threshold setting apparatus may be configured to perform any of the method steps and methods presented herein.

A third aspect of the present disclosure relates to a communication network analytics system comprising the apparatus presented herein.

A fourth aspect relates to a communication network system comprising the communication network analytics system presented herein and the communication network analyzed thereby.

BRIEF DESCRIPTION OF THE DRAWINGS

Further aspects, details and advantages of the present disclosure will become apparent from the detailed description of exemplary embodiments below and from the drawings, wherein:

FIG. 3 is a flow diagram of a first method realization of the present disclosure;

FIG. 5 is a flow diagram of a first stage of the second method realization of FIG. 4;

FIG. 9 is a flow diagram of a second stage of the second method realization of FIG. 4;

DETAILED DESCRIPTION

Figure 1:
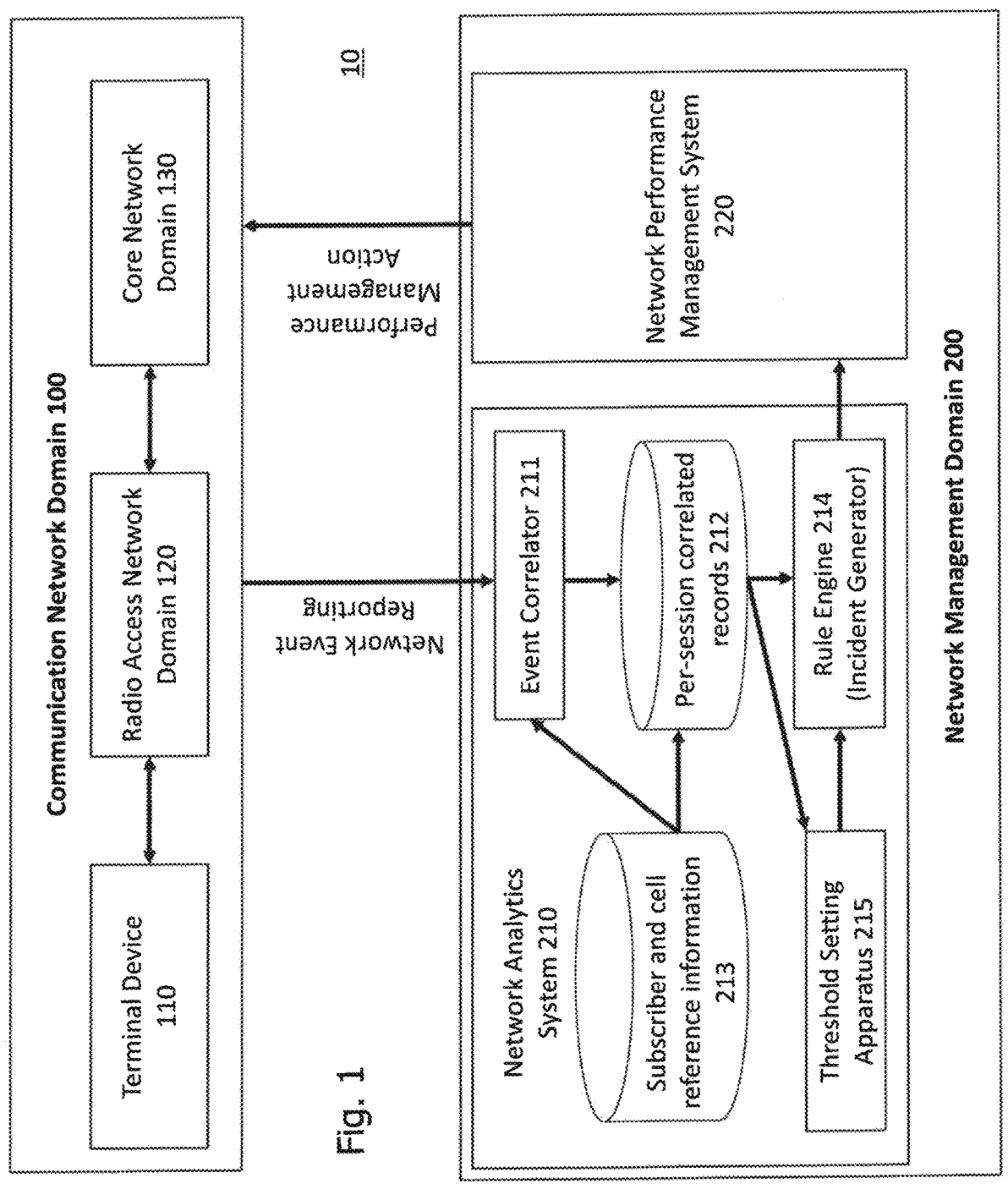
FIG. 1 is a diagram illustrating a communication network system of the present disclosure.

In the following description, for purposes of explanation and not limitation, specific details are set forth in order to provide a thorough understanding of the present disclosure. It will be apparent to one skilled in the art that the present disclosure may be practiced in other embodiments that depart from these specific details.

While, for example, some embodiments of the following description focus on an exemplary network configuration in accordance with 5G specifications, the present disclosure is not limited in this regard. In particular, the present disclosure could also be implemented in other wired or wireless communication networks (e.g., according to 4G specifications).

Those skilled in the art will further appreciate that the steps, services and functions explained herein may be implemented using individual hardware circuits, using software functioning in conjunction with a programmed microprocessor or general purpose computer, using one or more application specific integrated circuits (ASICs) and/or using one or more digital signal processors (DSP). It will also be appreciated that when the present disclosure is described in terms of a method, it may also be embodied in one or more processors and one or more memories coupled to the one or more processors, wherein the one or more memories store one or more computer programs that perform the steps, services and functions disclosed herein when executed by one or more processors.

In the following description of exemplary embodiments, the same reference numerals denote the same or similar components.

FIG. 1 illustrates an embodiment of a communication network system 10 in which the present disclosure can be implemented. The system 10 comprises a communication network domain 100 configured to provide communication services as well as to monitor network traffic and related events. The system 10 further comprises a network management domain 200 configured to analyze the monitoring results and to control traffic and event monitoring in the communication network domain 200. The network management domain 200 is further configured to trigger performance management actions in the communication network domain 100.

In the system embodiment of FIG. 1, the communication network system 10 configured as a mobile and in particular cellular communication network. As such, the communication network domain 100 comprises one or more wireless terminal devices 110 (also called user equipments, UEs), a radio access network (RAN) domain 120 and a core network (CN) domain 130. The RAN domain 120 and the CN domain 130 each comprises a large number of network functions (NFs). A particular NF may be a software entity (e.g., implemented using cloud computing resources), a standalone hardware entity (e.g., in the form a network node), or a combination thereof. In some variants, the NFs may conform to the definitions of "network functions" as standardized by the 3rd Generation Partnership Project (3GPP) in its 5G specifications, but in other variants (e.g., in 4G implementations) this may not be the case. Exemplary 5G NFs of the CN domain 130 include a user plane function (UPF), a session management function (SMF), an access and mobility management function (AMF), a universal data repository (UDR) and so on. The RAN domain 120 can be configured to include base stations conforming to one or both of 4G and 5G specifications. In other implementations, the RAN domain may include (e.g., WiFi) access points.

The entities in the communication network domain 100 are configured to report information on network events to the network management domain 200. In the context of the present disclosure, network events are to be construed broadly and also include, for example, parameters, indicators, metrics and counters reported from the communicate network domain 100. Network events generally characterize what is happening in the communication network domain 100, such as session initiation or termination, the status of an ongoing session, transmission of a certain amount of data, and so on. So called key performance indicators (KPIs) and other parameters, usually numeric values, can be reported as events "as such" or as characteristic parameters of one or more events, such as session initiation time, ratio of unsuccessful session initiations, the amount of transmitted bytes over a given amount of time, and so on. KPIs may also be calculated in the network management domain 200 based on network events reported by the communication network domain 100.

A network event can be reported when it is locally detected at a dedicated monitoring site (e.g., a dedicated NF) or in response to probing (e.g., by the network management domain 200). The network events can be standardized (e.g., 4G or 5G) signalling events or vendor-specific events (of, e.g., a network node acting as NF). Event probing may be performed in the communication network domain 100 to capture the events at a network interface, or to capture user plane traffic, sample it and generate user plane traffic metrics that are to be reported as one or more network events.

KPIs and other network event information can be calculated from, or attributed to, one or multiple network events. As an example, a handover failure can be reported in, or as, a network event. Exemplary KPIs calculated from this event, or from multiple such events, locally in the communication network domain 100, or centrally in the network management domain 200, are a number of handover failures or a ratio of the handover failures and the total handovers in a certain period of time. As another example, an NF user plane probe may report a throughput event every 5 s in a dedicated event report. An average throughput KPI can be calculated locally, or centrally, as the average of these throughputs for 1 min, and a maximum throughput KPI can be calculated locally, or centrally, as the maximum of the reported throughputs in 1 min.

With continued reference to FIG. 1, the network management domain 200 in the present embodiment comprises a network analytics system 210 and a network performance management system 220. The network analytics system 220 is configured to receive events (including, e.g., counters) reported by the communication network domain 100. The network analytics system 220 is further configured to generate an incident message to the network performance management system 220 if a critical network condition is detected based on the reported events. The incident message may comprise a root cause indication and further information associated with the critical network condition.

The network performance management system 220 is configured to trigger an alarm or a network performance action responsive to the incident message. If needed, further manual root cause analysis is done in the network management system 220, such as a detailed investigation of network logs, to decide about a suitable network performance action. The network performance action is intended to resolve the root cause in the communication network domain 100 and may involve a manual interaction by network optimization engineering.

As illustrated in FIG. 1, the network analytics system 210 comprises an event correlator 211 configured to correlate different events reported by the communication network domain 100. The correlation may include one or more of an event aggregation and an association of events that are related in at least one of a temporal and logical context. The temporal context may be defined by certain time resolution (e.g., one or more seconds or one or more minutes). The logical context may be defined by an individual communication session, a particular subscription identifier, and so on.

The event correlator 211 is in some variants configured to generate data records on a per-session basis, with each such data record containing information from the events correlated by the event correlator 211. One or more such data records may be generated per session. In other variants, the data records may be generated on a per-subscriber basis, a per-cell basis, or any other basis.

As shown in FIG. 1, the data records generated by the event correlator 211 are stored in a database 212. The network event information or the content of the data records may in some variants be enhanced (i.e., enriched or supplemented) with further information pertaining for example to at least one of individual subscribers (e.g., subscription identifiers, service level agreements, etc.) and individual cells (e.g., cell identifiers, geographical information, etc.). The further information may in some realizations be associated with a corresponding session for which a certain data record has been generated. The further information may be taken (e.g., by the event correlator 211 or another entity capable of data record enhancement) from a dedicated database 213 with subscriber and cell reference information. In FIG. 1, the database 213 is shown to be a part of the analytics system 210, but it could in other implementations at least partially be located in the core network domain 130 (e.g., in the form of a UDR or similar core network database storing information on subscribers and/or cells).

A rule engine 214 of the analytics system 210 is configured to analyze the data records in the database 212 based on one or more predefined network analytics rules and to generate the incident messages. As explained above, an incident message will be generated by the rule engine 214 if a critical network condition is detected upon applying the one or more rules to the information stored in the data records.

In the present embodiment, the one or more network analytics rules are applied by the rule engine 214. The rules are applied to the information (e.g., KPI values) as included in the data records or to (e.g., aggregated or otherwise processed) information derived therefrom. The rules many be applied to parametric information. At least one rule applied by the rule engine 214 includes one or more decision thresholds. One or more of the decision thresholds may be configured to separate critical from non-critical parameter values. The one or more rules may be defined such that a critical parameter value or a certain constellation of multiple critical parameter values is interpreted as a critical network condition. Multiple rules may be applied in parallel or in a sequence, wherein the critical network condition may be detected based on the joint outcome of the applied multiple rules. Of course, multiple rules applied in parallel or in sequence (e.g., with multiple decision thresholds) may be considered to constitute a single, more complex rule. Detection of the critical network condition by the rule engine 214 triggers generation of an incident message that notifies the network performance management system 220 of the need to initiate a performance management action.

It will be assumed here that the rule engine 214 is configured to apply one or more network analytics rules to statistics information, or simply statistics, pertaining to at least one service quality-related (SQR) parameter (e.g., pertaining to a quality of experience, QoE, such as quality of a video streamed by the terminal device 110 via the RAN domain 120 and the CN domain 130) and statistics pertaining to at least one root cause-related (RCR) parameter (e.g., pertaining to radio conditions experienced in the RAN domain 120). The RCR parameter may not directly be indicative of a particular root cause but allow a conclusion in regard to one or more possible root causes. Depending on the parameter type, the critical parameter values may, for example, be indicative of a critical service quality degradation or of a possible root cause for the critical service quality degradation.

In some variants, one or more first network analytics rules are applied by the rule engine 214 to the SQR parameter statistics. In response to detection of a service quality degradation, one or more second network analytics rules are applied to the RCR parameter statistics. In response to additionally detecting a possible root cause based on the one or more second network analytics rules, an incident message may be generated by the rule engine 214 and sent to the performance management system 220. In such variants, no incident message will be generated if the service quality degradation detected by the applied one or more first network analytics rules is not "confirmed", or "back-up", by an additional detection of at least one possible root cause. An exemplary "aggregated" rule comprising application of a service-specific first network analytics rule followed by application of multiple second network analytics rules will be described below.

The SQR parameter may be derived from, or may be indicative of, one or more events (including, e.g., counters) relating to a user plane of the core network domain 130. As a further example, the RCR parameter may be derived from, or may be indicative of, at least one of one or more radio environment measurements, one or radio signalling events, and one or more events (including, e.g., counters) relating to the core network domain 130. Both the SQE parameter and the RCR parameter (and further information) may be included in the data records of the database 212.

At least one of the RCR parameter and the SQR parameter may be a KPI pertaining to the communication network domain 100. As an example, the RCR parameter may be indicative of a reference signal received power (RSRP) or a reference signal received quality (RSRQ). As a further example, the SQE parameter may relate to a QoE metrics, such as a video-related QoE metrics (e.g., video stalling) or any other mean opinion score (MOS). The SQR parameter may correlate with the RCR parameter. As an example, the SQR parameter may correlate with the RCR parameter in that a possibly prevailing root cause as indicated by a critical PCR parameter value (e.g., a low RSRP) potentially gives rise to a service quality degradation as indicated by a critical SQR parameter value (e.g., frequent video stalling).

As illustrated in FIG. 1, the analytics system 210 further comprises a threshold setting apparatus 215. The threshold setting apparatus 215 is configured to set at least one decision threshold of at least one rule applied by the rule engine 215. The decision threshold is set dependent on parametric information included in or derived from the data records in the database 212. The at least one decision threshold may be configured to separate critical from non-critical parameter values.

Figure 2:
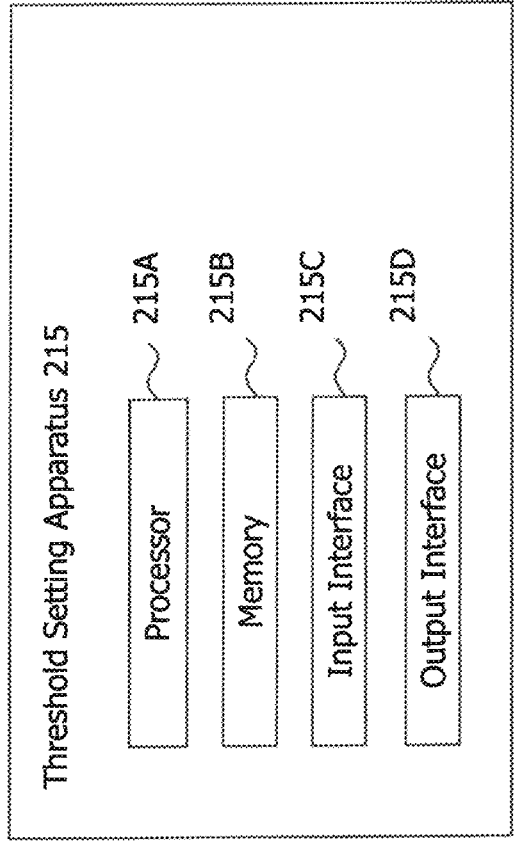
FIG. 2 is a block diagram illustrating a decision threshold setting apparatus in accordance with the present disclosure.

In the following, an embodiment of the threshold setting apparatus 215 of FIG. 1 will be described with reference to a block diagram as shown in FIG. 2, and operational details of the threshold setting apparatus 215 will be described with reference to a method embodiment illustrated in FIG. 3 as a flow diagram 300.

In the exemplary apparatus embodiment illustrated in FIG. 2, the threshold setting apparatus 215 comprises at least one processor 215A and a memory 215B coupled to the processor 215A. The memory 215B stores program code (e.g., in the form of a set of instructions) that controls operation of the processor 215A so that the threshold setting apparatus 215 is operative to perform any of the operational aspects presented herein (see, e.g., FIGS. 3, 4, 5 and 9).

The threshold setting apparatus 215 further comprises at least one input interface 215C and at least one output interface 215D. The interfaces 215C, 215D are configured for communication with the database 212 on the one hand and the rule engine 214 on the other hand. The interfaces 215C, 215D may be hardware interfaces, software interfaces, or a combination thereof.

As understood herein, the processor 215A may be implemented using any processing circuitry, and is not limited to, for example, a single processing core, but may also have a distributed topology (e.g., using cloud computing resources). Moreover, the processor 215A may be configured to perform one or more further operational aspects of the analytics system 210, such as those of the rule engine 214.

Referring to the structural representation of the threshold setting apparatus 215 of FIG. 2 and the flow diagram 300 of FIG. 3, operation of the threshold setting apparatus 215 will now be described in more detail. In the context of the method embodiment illustrated in FIG. 3, a first parameter is defined to be one of the SQR parameter and the RCR parameter and a second parameter is defined to be the other of the SQR parameter and the RCR parameter. Of course, the present disclosure can readily be extend to multiple SQR parameters and multiple RCR parameters.

The method embodiment of FIG. 3 comprises a step 302 of obtaining first statistics for the first parameter in situations (e.g., points in time or periods of time) in which the second parameter assumes critical second parameter values. The method embodiment further comprises a step 304 of obtaining second statistics for the first parameter in situations (e.g., points in time or periods of time) in which the second parameter assumes non-critical second parameter values. The critical second parameter values may be separated form the non-critical parameter values in any manner. As an example, a threshold decision may be applied to this end (e.g., to continuous or multi-valued second parameter values) or a binary decision may be performed. The binary decision may be made in relation to binary second parameter values (e.g., value OK vs. value not OK).

Steps 302 and 304 can be performed in any order and also in parallel. In some variants, the obtaining steps 302 and 304 include calculation of the first and second statistics, for example by the processor 215A of the threshold setting apparatus 215 and based on information stored in the data records of the database 212. In other variants, the first and second statistics are obtained in steps 302 and 304 as (pre-calculated) information, for example via the input interface 215C, from a statistics calculation entity not illustrated in FIG. 1.

At least one of the first statistics and the second statistics obtained in steps 302 and 304, respectively, may take the form of a parameter value distribution (e.g., a normalized distribution). The parameter value distribution may take the form or, or may be representable as, a histogram.

If at least one of the RCR parameter and the SQR parameter assumes continuous parameter values, the associated parameter value distribution may be obtained by applying a binning operation to the continuous parameter values (or by applying any other discretization approach). The binning operation may be applied to all parameter values that relate to a certain time window, so that the corresponding statistics will also relate to that time window. New statistics may then be derived for parameter values that pertain to the next time window, and so on. For the purposes of the discretization and statistics generation operations, the network events may be received from the communication network domain 100 with associated temporal information, such as time stamps.

With continued reference to FIG. 3, the method further comprises a step 306 of setting a first decision threshold of the analytics system based on an analysis of the first statistics (as obtained in step 302) and the second statistics (as obtained in step 304). The first decision threshold is defined to separate critical from non-critical first parameter values. The first decision threshold may be output by the threshold setting apparatus 215, via the output interface 215D, to the rule engine 214 so as to set the first decision threshold for a particular rule applied by the rule engine 214.

For setting the first decision threshold, the first statistics and the second statistics may be analyzed in step 306 by the processor 215A to derive at least one of the following two attribute sets for attribution to the first and second statistics (e.g., to individual ranges, bins or bin sets):

(false critical; false non-critical) and
(true non-critical; true critical), with
a primary attribute "critical" or "non-critical" being associated with first decisions for the first parameter values, and
a secondary attribute "true" or "false" being associated with second decisions for the second parameter values dependent on whether or not the respectively associated first decision can be confirmed.

The first decision threshold may be set to configure one or both of the relative probabilities (or ratio) of (false critical; false non-critical) decisions and the relative probabilities (or ratio) of (true critical; true non-critical) decisions by the rule engine 214. As an example, the first decision threshold may be set to equalize, based on the first statistics and the second statistics, the probabilities or numbers of "false critical" and "false non-critical" decisions. Alternatively, the probabilities or numbers of "true critical" and "true non-critical" decisions may be equalized. Of course, depending on MNO preferences, an equalization of the decision probabilities may not always be desired.

In some variants, the first parameter is the SQR parameter and the second parameter is the RCR parameter. In other variants, the first parameter is the RCR parameter and the second parameter is the SQR parameter.

If the first parameter is the SQR parameter and the second parameter is the RCR parameter, the first statistics may be obtained for a dedicated service out of a set of services (e.g., video, voice, Web browsing, etc.) supported by the communication network domain 100. In such a case, a dedicated first threshold may be set in step 306 for each of two or more dedicated services out of the set of services. A second decision threshold may be defined to separate the critical from the non-critical second parameter values. Also in such a case, a dedicated second threshold may be defined for each of two or more dedicated services out of the set of services. The second statistics may obtained for a dedicated RCR parameter out of a set of RCR parameters indicative of one or more root causes potentially leading to a service quality degradation. In such a case, a dedicated second threshold may be set for each of two or more RCR parameters out of the set of RCR parameters. In some variants, there can be a one-to-one mapping between multiple RCR parameters and multiple root causes. As an example, the root cause of excessive interference can uniquely be associated with the RCR parameter RSRQ.

As said, the second decision threshold may be defined to separate the critical from the non-critical second parameter values. The method embodiment may then further comprise obtaining third statistics for the second parameter in situations in which the first parameter assumes critical first parameter values, obtaining fourth statistics for the second parameter in situations in which the first parameter assumes non-critical first parameter values, and setting the second decision threshold based on the third statistics and the fourth statistics (e.g., in a similar manner as illustrated in FIG. 3 for the first parameter, but possibly in subsequent steps). In a similar manner as explained above for the first decision threshold, for setting the second decision threshold the third statistics and the fourth statistics may be analyzed to derive at least one of the following two attribute sets for attribution to the third and fourth statistics (e.g., to individual ranges, bins or bin sets):

(false critical; false non-critical) and
(true non-critical; true critical), with
a primary attribute "critical" or "non-critical" being associated with second decisions for the second parameter values, and
a secondary attribute "true" or "false" being associated with first decisions for the first parameter values dependent on whether or not the respectively associated second decision can be confirmed.

In the data science world, the terminology negative/positive is sometimes used instead of critical/non-critical. As such, the attribute sets above could also be expressed as (false negative; false positive) and (true positive; true negative).

The second decision threshold may be set to configure at least one of the relative probabilities (or ratio) of (false critical; false non-critical) decisions and the relative probabilities (or ratio) of (true critical; true non-critical) decisions. For example, the second decision threshold is set to equalize, based on the first statistics and the second statistics, one of the probabilities or numbers of "false critical" and "false non-critical" decisions and the probabilities or numbers of "true critical" and "true non-critical" decisions. Also here, depending on MNO preferences, an equalization of the decision probabilities may not always be desired.

The one or more decision thresholds set by the threshold setting apparatus 215 may be used by the rule engine 214 during operation of the network analytics system 210. Using the decision threshold set for the SQR parameter, the rule engine 214 may apply a predefined network analytics rule (including that threshold) for detecting, based on one or more critical values of the SQR parameter, a service quality degradation. The rule engine 214 may further apply the predefined rule, or another predefined rule, to perform, in response to detection of the service quality degradation, an analysis of a possibly prevailing root cause based on the RCR parameter values. For example, using the threshold set for the RCR parameter the rule engine 214 may detect, based on one or more critical values of the RCR parameter, that a root cause is possibly prevailing. In such a case, the rule engine 214 may trigger generation of an incident notification (possibly indicative of a particular root cause), as generally explained above with reference to FIG. 1.

The steps of setting the first decision threshold and of setting the second decision threshold may be iteratively repeated. For example, once the first decision threshold has been set, the corresponding threshold value may be applied for re-setting the second decision threshold set (possibly based on updated statistics). The first decision threshold setting will thus influence the calculation underlying the second decision threshold setting, and vice versa. This iterative process may be repeated until an abortion criterion is fulfilled (e.g., until one or both of the decision thresholds changing less than a predefined amount between successive iterations).

The iterative optimization of the first decision threshold setting and the second decision threshold setting will now be explained in greater detail with reference to the flow diagram 400 of FIG. 4. It will be assumed here that the first parameter (in the terminology of FIG. 3) is the SQR parameter and the second parameter (in the terminology of FIG. 3) is the RCR parameter.

Figure 4:
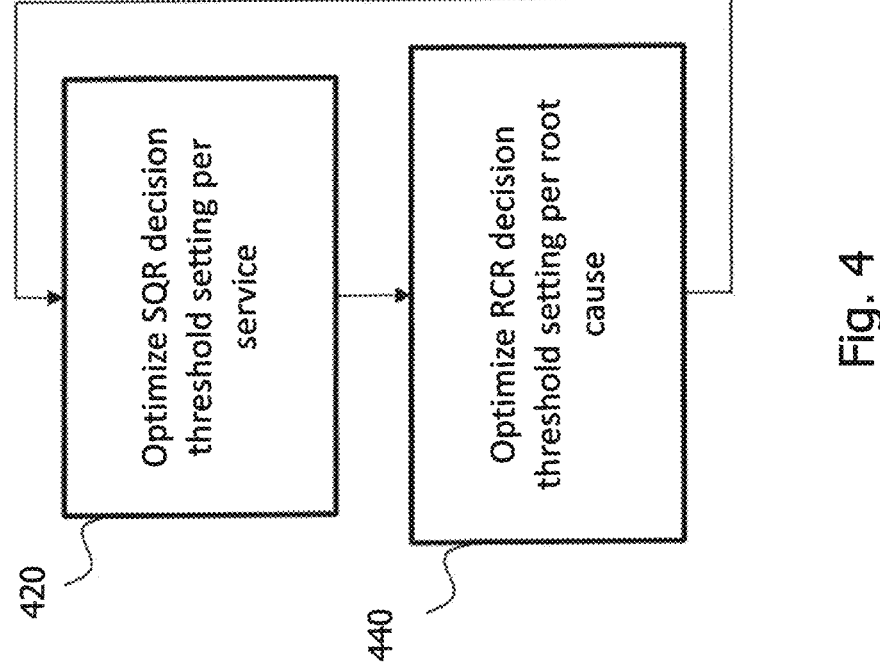
FIG. 4 is a flow diagram of a second method realization of the present disclosure.

As shown in FIG. 4, the SQR decision threshold setting and the RCR decision threshold setting are optimized consecutively and iteratively in dedicated two stages 420 and 440, respectively, and iteratively. In stage 420, multiple SQR decision thresholds may be optimized in parallel, and the same applies to RCR decision thresholds optimized in stage 440. There exists a dedicated SQR decision threshold for each of a plurality of dedicated services, and a dedicated RCR decision threshold for each of a plurality of dedicated RCR parameters.

Details of the SQR decision threshold setting stage 420 are illustrated in FIG. 5.

As indicated by step 422, at least one dedicated SQR decision threshold setting is optimized for each of possibly multiple services, such as a video service and a voice service. Each service is associated with a dedicated SQR decision threshold for at least one SQR parameter. The SQR parameter may be the same for two or more services, but each service may be associated with a dedicated SQR decision threshold in this case. So for the same SQR parameter, different SQR decision thresholds may apply for different services. In other implementations, different services may be associated with different SQR parameters. In certain variants, a video MOS decision threshold (as one example of an SQR decision threshold associated with a video service) may initially be set to 3.2 and a voice MOS decision threshold (as another example of an SQR decision threshold associated with a voice service) may initially be set to 3.0. In such variants, a video service quality-related MOS value is deemed critical below 3.2 and a voice service quality-related MOS value is deemed critical below 3.0, due to violation of the respectively associated decision threshold.

There further exists a dedicated RCR decision threshold setting for each of possibly multiple RCR parameters (and possibly associated root causes, such as bad radio coverage and network congestion). A root cause may associated with one or more dedicated RCR parameters (e.g., a dedicated KPI such as RSRP or data throughput). As an example, for radio coverage the RCR decision threshold in terms of RSRP may be set to −120 dB, with RSRP parameter values below −120 dB being interpreted as critical due to violation of the RSRP decision threshold. In some variants, the one or more RCR decision thresholds are the same for each service. As an example, the RCR decision threshold in terms of RSRP may be set to −120 dB for voice service-related threshold optimization and video service-related threshold optimization. In other variants, there may be different RCR decision thresholds for different services (and possibly different root causes).

In steps 424 and 426, which correspond to steps 302 and 304 of FIG. 3, respectively, statistics (here: normalized distributions) for the respective SQR parameter are obtained per service. In some implementations, the statistics are calculated by the threshold setting apparatus 215 based on the information contained in the data records of database 212 (see FIG. 1). The statistics may take the form of, or may be representable as, histograms.

The statistics are in some variants calculated over SQR parameter values (as derived from the data records) that have been acquired in the communication network domain 100 during a certain time window (e.g., of one or more minutes or one or more hours to gather sufficient data for generation of reliable statistics). The statistics may be calculate anew for the next time window, and so on. Each time window may correspond to a new iteration of stage 420. In case of continuous SQR parameter values, a binning operation or other discretization approach may be applied prior to calculation of the statistics.

As illustrated in FIG. 4, the statistics are obtained (here: calculated) separately for SQR parameter values that have been acquired in "critical" RCR situations (i.e., when at least one RCR decision threshold has been violated, see step 424) and for SQR parameter values that have been acquired in "non-critical" RCR situations (i.e., when none of the RCR decision thresholds has been violated, see step 426). For the purpose of steps 424 and 426, corresponding SQR parameter values and RCR parameter values may be associated ("correlated") in a single data record (e.g., by a session context if the data records have been generated per session) or otherwise (e.g., by matching time stamps or by falling in a single time slot within an optionally larger time window) to allow a determination of whether or not there has been a "critical" RCR situation upon acquisition of a dedicated SQR parameter value. If, for example, for a certain session and a certain time slot a given SQR parameter value is correlated with a certain RCR parameter value, this will result in one data point (i.e., in terms of the SQR parameter value) for one of the statistics obtained in steps 424 and 426. The next time slot for this session or the same time slot for another session result in further data points. The data points may then form the basis of the statistics calculated in steps 424 and 426.

In the above example of an RCR decision threshold in terms of RSRP that is set to a value of −120 dB, step 424 pertains to SQR parameter statistics derived from SQR parameter values associated with RSRP parameter values below −120 dB, whereas step 426 pertains to SQR parameter statistics derived from SQR parameter values associated with RSRP parameter values of −120 dB or above. Still in the above example, a certain video MOS value of, for example, 2.4 in a data record indicative of an RSRP value of, for example, −133 dB would as a data point enter the statistics obtained in step 424, whereas another video MOS value of, for example, 3.1 in a data record indicative of an RSRP value of, for example, −99 dB would as a data point enter the statistics obtained in step 426. In case of multiple different RCR parameter values (e.g., for RSRP and RSRQ) per data record and associated multiple RCR decision thresholds, violation of a single RCR decision threshold per data record will suffice to enter the branch of step 424, whereas the branch of step 426 is only be entered if none of the multiple RCR decision thresholds is violated by the associated RCR parameter values in a given data record.

Figure 6:
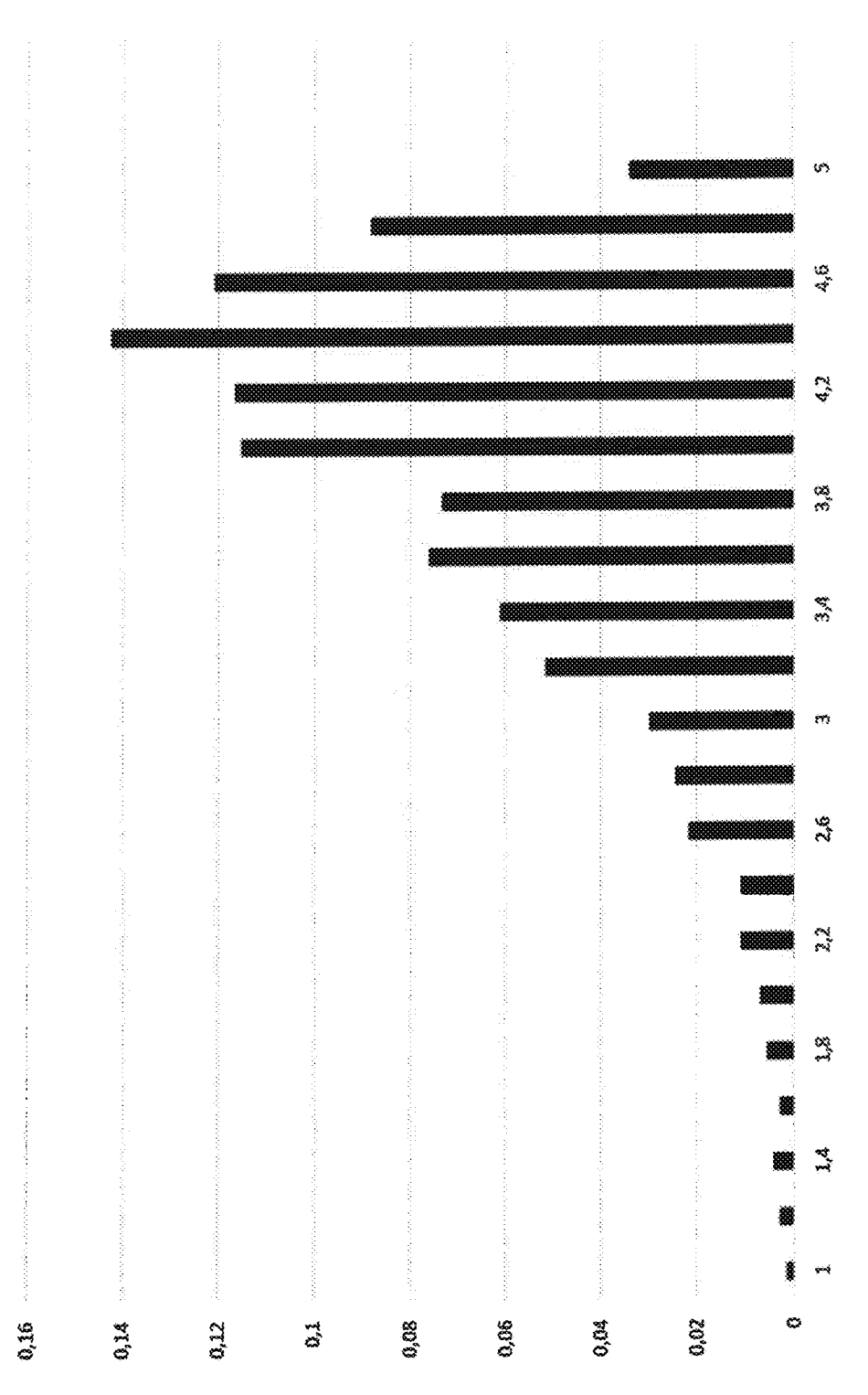
FIGS. 6-7 schematically illustrate SQR parameter statistics in accordance with the present disclosure.

FIG. 6 illustrates the normalized distribution of video MOS values that are associated with non-critical RCR parameter values (i.e., no RCR decision threshold violation and, thus, no detectable RCR issue). Such a normalized distribution may be obtained in step 426 or step 304.

Referring to FIG. 6, it can be assumed that high MOS values (i.e., non-critical SQR parameter values) properly correlate with the fact that no RCR issue has been detected. Those MOS values (and the associated bins) can thus be considered to be of the attribute type true non-critical, where the primary attribute "non-critical" is associated with non-critical SQR parameter values and the secondary attribute "true" is associated with RCR parameter values that confirm the associated SQR decision "non-critical". What is apparent in FIG. 6 is the fact that there exist low MOS values although the associated RCR parameter does not indicate an RCR issue (i.e., the low MOS values improperly indicate an associated service quality degradation while there is in fact no violation of any RCR decision threshold). Those MOS values can thus be considered to be of the attribute type false critical, where the primary attribute "critical" is associated with critical SQR parameter values and the secondary attribute "false" is associated with RCR parameter values that do not confirm the associated SQR decision. As explained above, critical MOS values are separated from-non critical MOS values based on the associated SQR decision threshold (of, for example, 3.2 in the above video quality-related MOS example).

Figure 7:
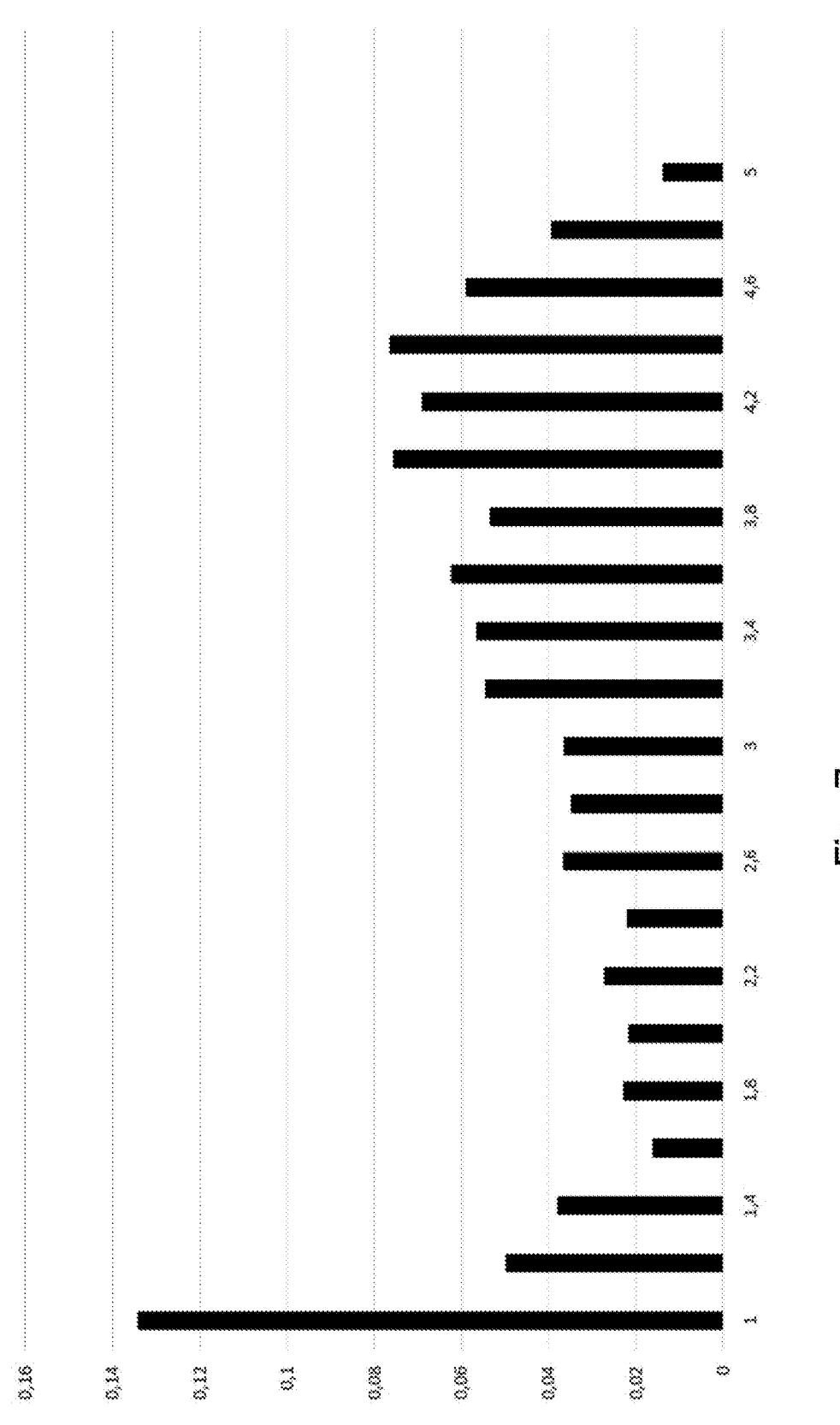

FIG. 7 illustrates the normalized distribution of video MOS values that are associated with critical RCR parameter values (i.e., with RCR decision threshold violations indicative of a possible RCR issue). Such a normalized distribution may be obtained in step 424 or 302.

What is apparent in FIG. 7 is the fact that there exist high MOS values although the RCR parameter indicates a likely RCR issue (i.e., there is a violation of the RCR decision threshold despite the high MOS improperly indicating a high service quality). Those high MOS values can thus be considered to be of the attribute type false non-critical, because in view of the RCR issue there can in fact be no high service quality. It can further be assumed that low MOS values (i.e., critical SQR parameter values) properly correlate with the RCR decision threshold violation. Those MOS values can thus be considered to be of the attribute type true critical, where the primary attribute "non-critical" is associated with non-critical SQR parameter values and the secondary attribute "true" is associated with decisions for the RCR parameter values that confirm the associated SQR decision.

Returning to FIG. 5, the statistics obtained in steps 424 and 426 are analyzed by the threshold setting apparatus 215 in step 428 to calculate a (possibly new) decision threshold value for the SQR parameter. To this end, the decision threshold value is determined to configure the relative probabilities of the (false critical; false non-critical) decisions or of the (true non-critical; true critical) decisions. In some variants, the relative probabilities of the (false critical; false non-critical) decisions or of the (true non-critical; true critical) decisions may be equalized.

Figure 8:
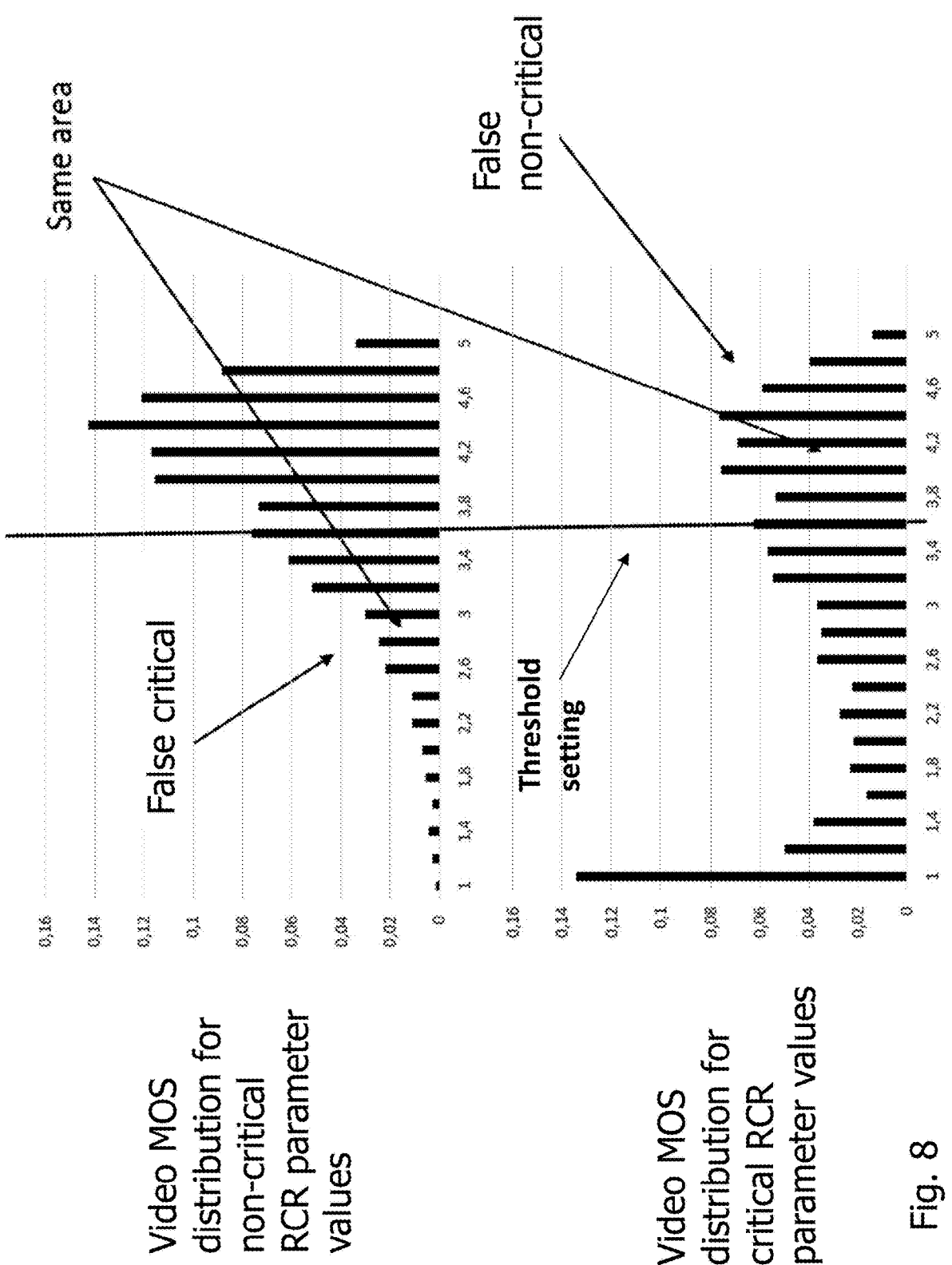
FIG. 8 schematically illustrates a decision threshold setting for exemplary SQR parameter statistics in accordance with the present disclosure.

In the equalization scenario of FIG. 8 (for the statistics of FIGS. 6 and 7), the decision threshold value is configured such that the relative probabilities of the (false critical; false non-critical) decisions are equalized. Since the statistics of FIGS. 6 and 7 are normalized distributions, the equalization can be performed such that the area (or numbers) of false critical decisions corresponds to the area (or numbers) of false non-critical decisions. In the example of FIG. 8, the new video quality-related MOS decision threshold will thus be set to a value of 3.6. Depending on MNO preferences, a more sensitive analytics system 210 may be desired, in which case the probability ratio will not be equalized but the threshold is shifted towards the false critical cases. In a similar manner the threshold may be shifted towards the false non-critical cases in other cases.

Once a decision threshold value for the SQR parameter has been calculated in step 428, the threshold setting apparatus 215 sets the corresponding threshold in step 430 at the rule engine 214 (see FIG. 1). At this point, stage 420 has been completed and the optimization routine proceeds to stage 440 of FIG. 4 to optimize the decision threshold setting for the RCR parameter as illustrated in FIG. 9.

As indicated by step 442 in the FIG. 9, a dedicated RCR decision threshold setting is optimized for each of possible multiple RCR parameters, such as RSRP and RSRQ, and possibly associated root causes. Each RCR parameter is associated with a dedicated RCR decision threshold. For example, in terms of RSRP as an exemplary RCR KPI, an associated threshold value may initially be set to −120 dB, wherein an RSRP value is deemed critical below −120 dB and non-critical at or above −120 dB.

In steps 444 and 446, which correspond to steps 302 and 304 of FIG. 3, respectively, statistics (here: normalized distributions) for the respective RCR parameter are obtained per root cause. In some implementations, the statistics are calculated by the threshold setting apparatus 215 based on the information contained in the data records of database 212 (see FIG. 1). The statistics are in some variants calculated over RCR parameter values (as derived from the data records) that have been acquired in the communication network domain 100 during a certain time window (e.g., a certain time slot of one or more seconds or one or more minutes). The statistics may be calculate anew for the next time window, and to so on. Each time window may correspond to a new iteration of stage 440. In case of continuous RCR parameter values, a binning operation or other discretization approach may be applied prior to calculation of the statistics.

As illustrated in FIG. 9, the statistics are calculated separately for RCR parameter values that have been acquired in "critical" SQR situations (i.e., when the SQR decision threshold as set in step 430 has been violated, see step 444) and for RCR parameter values that have been acquired in "non-critical" SQR situations (i.e., when the SQR decision threshold as set in step 430 has not been violated, see step 446). For the purpose of steps 444 and 446, corresponding SQR parameter values and RCR parameter values may be associated ("correlated") as explained above in the context of steps 424 and 426 of FIG. 5.

Figure 10:
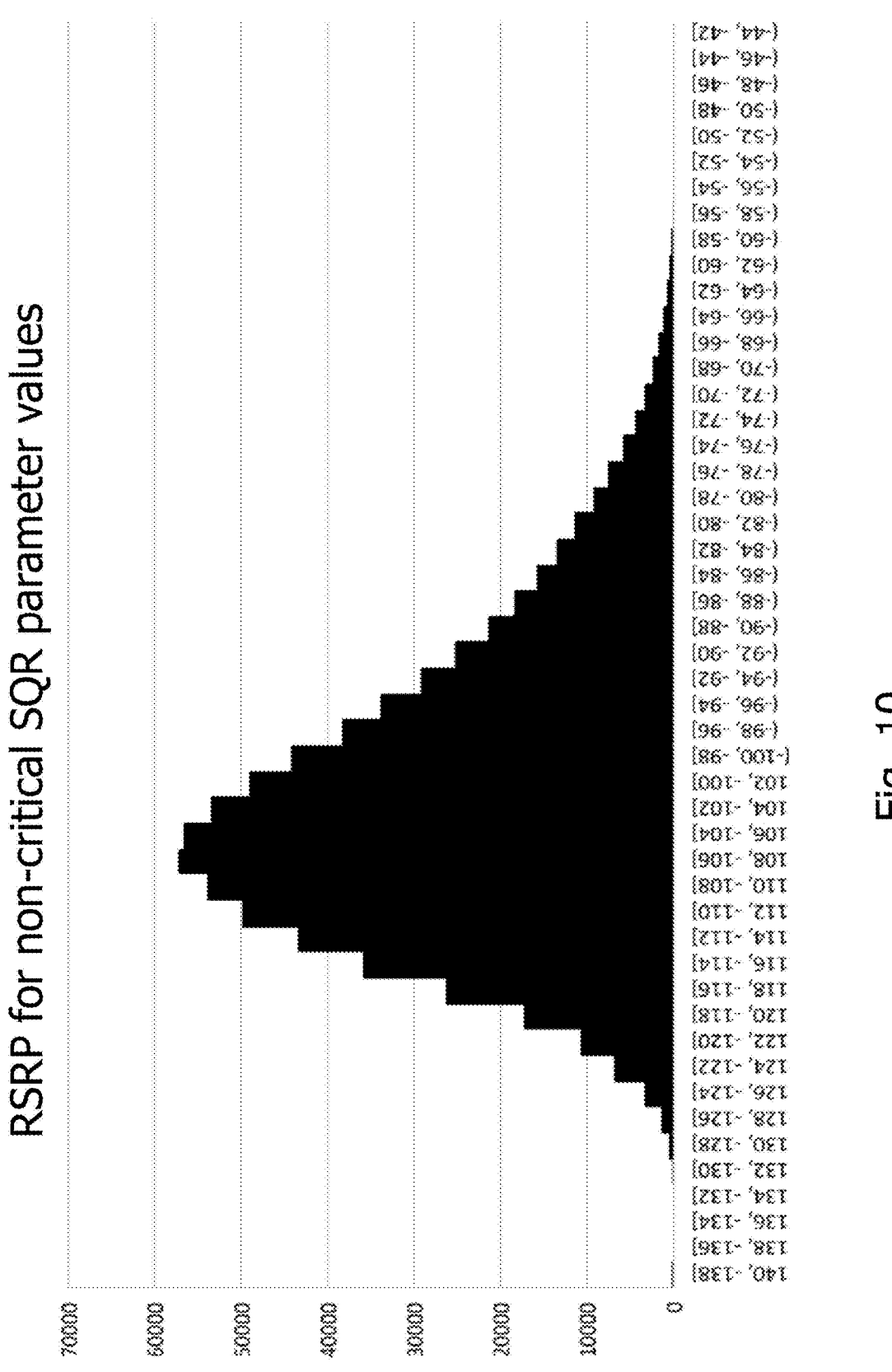
FIGS. 10-13 schematically illustrate RCR parameter statistics in accordance with the present disclosure.
Figure 11:
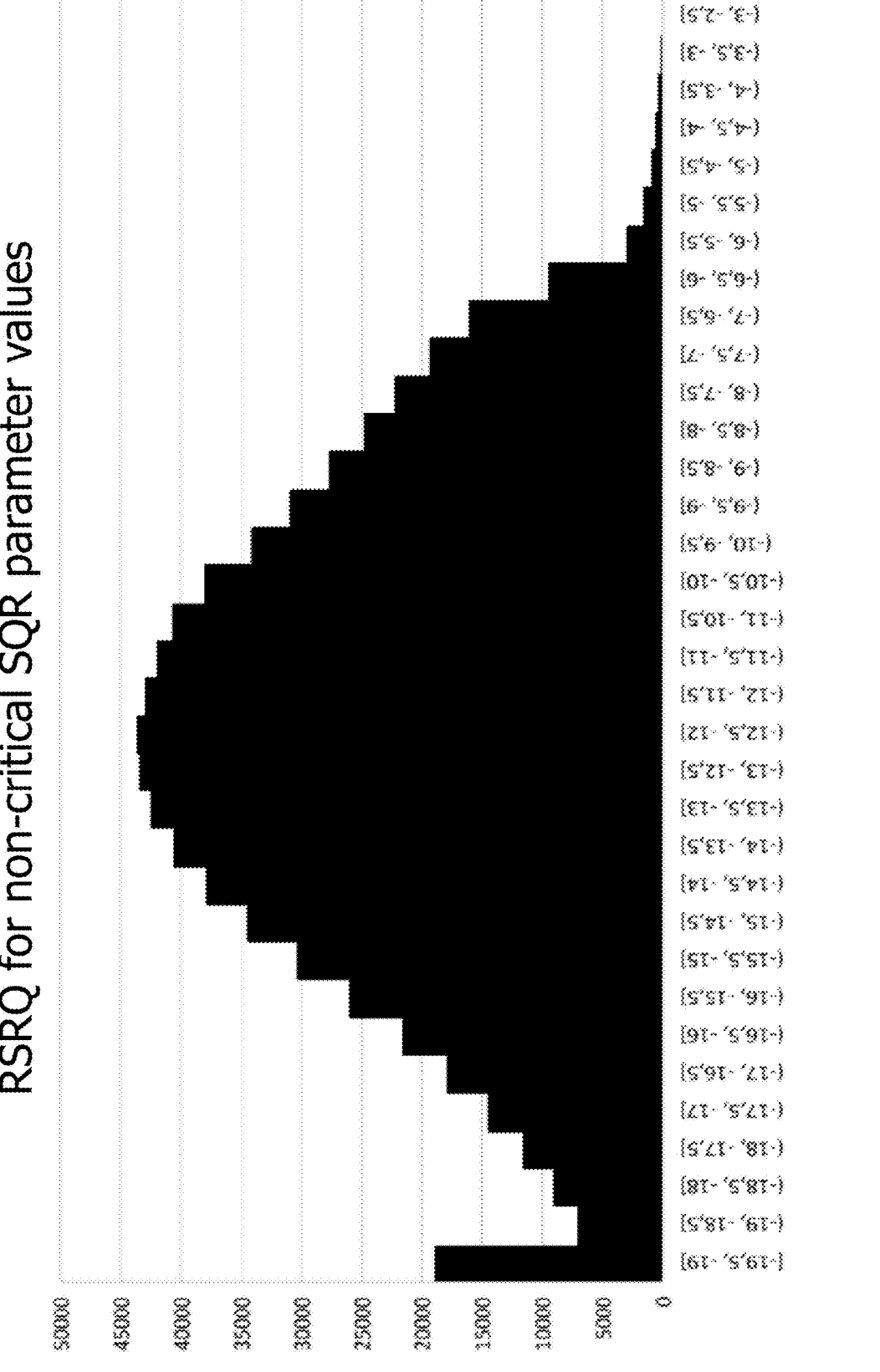

FIGS. 10 and 11 illustrate exemplary normalized distributions of RSRP and RSRQ values, respectively, that are associated with non-critical SQR parameter values (e.g., when the video quality-related decision threshold setting of FIG. 8 is not violated). Such normalized distributions may be obtained in step 446 or step 304.

Figure 12:
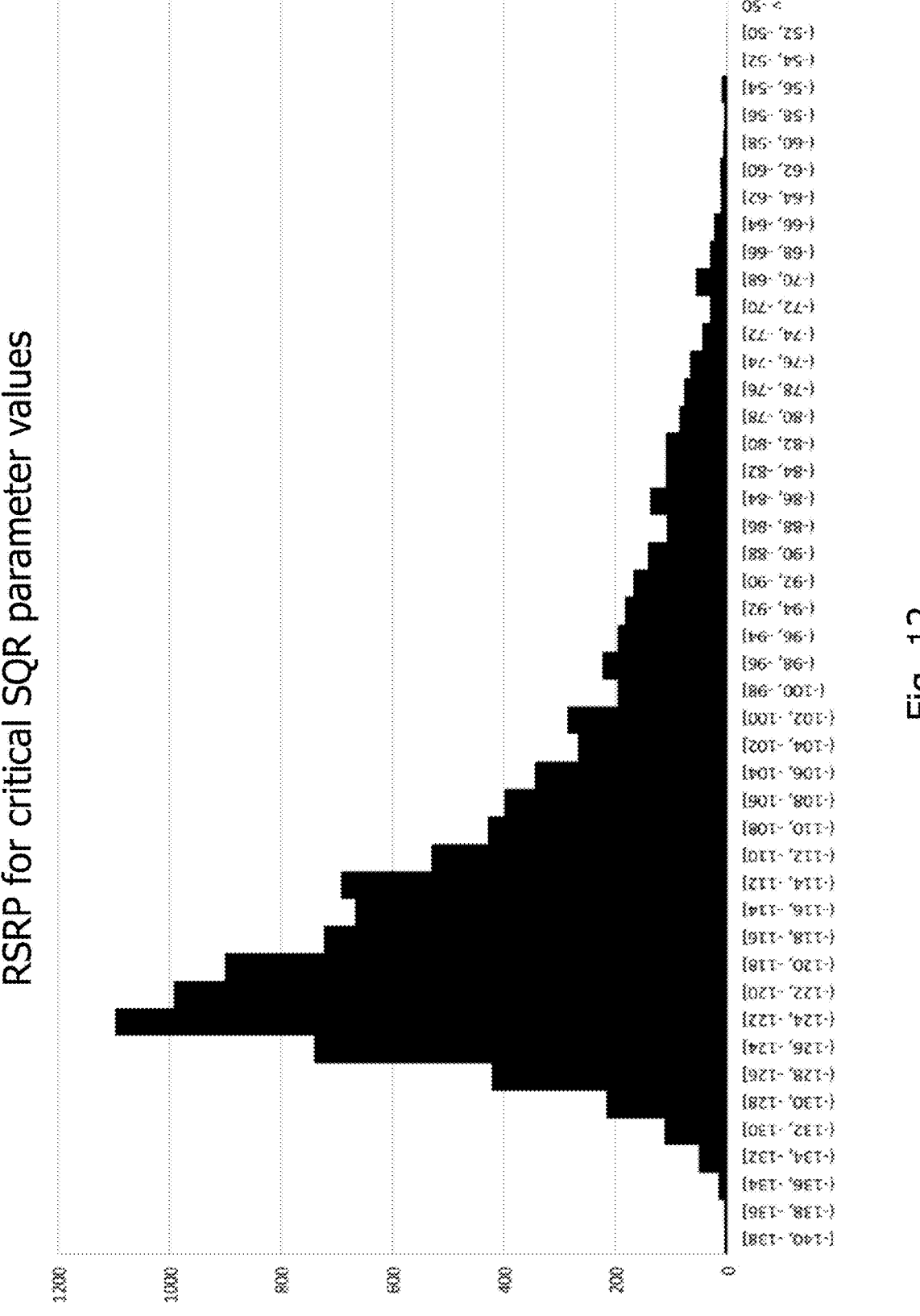
Figure 13:
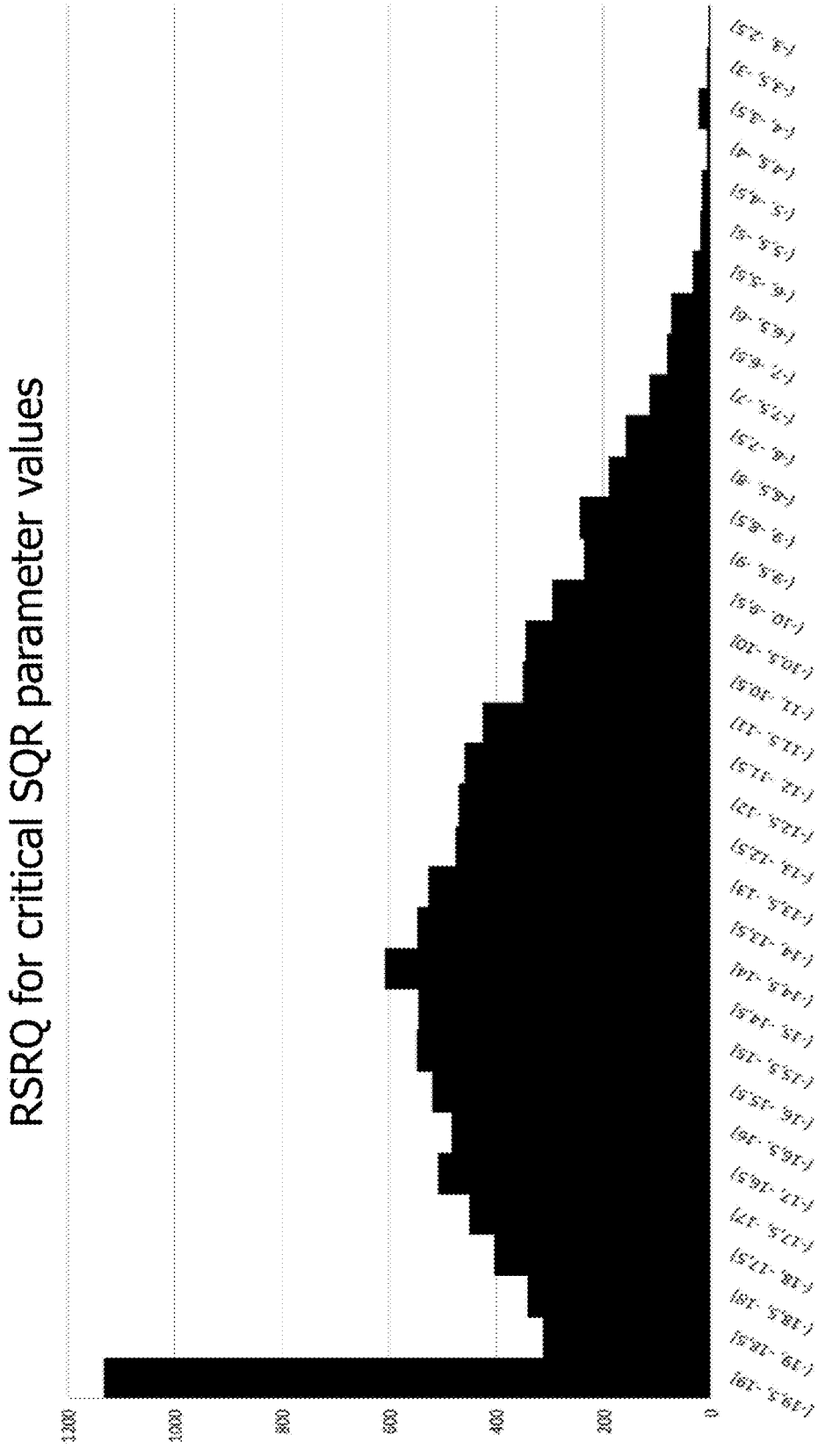

FIGS. 12 and 13 illustrate exemplary normalized distributions of RSRP and RSRQ values, respectively, that are associated with critical SQR parameter values (e.g., when the video quality-related decision threshold setting of FIG. 8 is violated). Such normalized distributions may be obtained in step 444 or step 304.

Returning to FIG. 9, the statistics obtained in steps 444 and 446 are analyzed by the threshold setting apparatus 215 in step 448 to calculate a (possibly new) decision threshold value for each RCR parameter. To this end, the decision threshold value is determined to configure the relative probabilities of the (false critical; false non-critical) decisions or of the (true non-critical; true critical) decisions. In some variants, the relative probabilities of the (false critical;

false non-critical) decisions or of the (true non-critical; true critical) decisions may be equalized.

Figure 14:
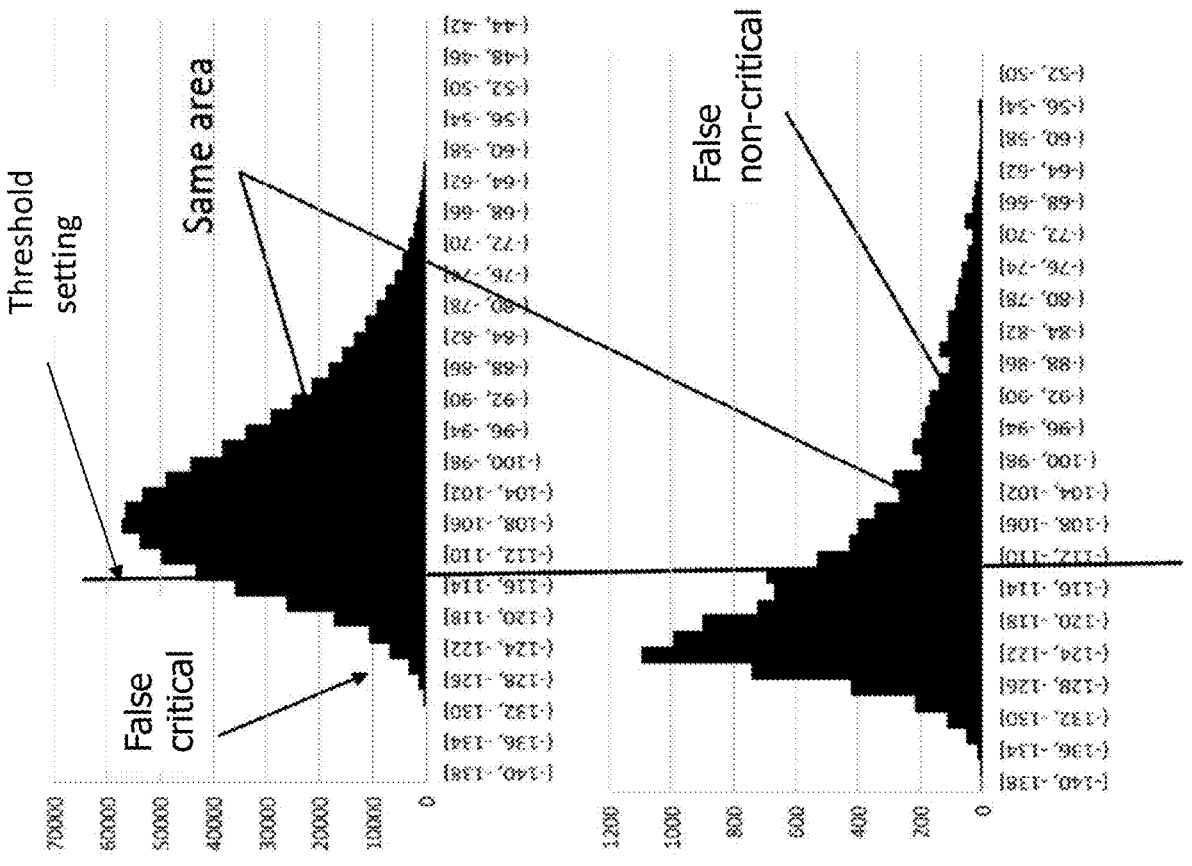
FIG. 14 schematically illustrates a decision threshold setting for exemplary RCR parameter statistics in accordance with the present disclosure.

In the equalization scenario of FIG. 14 for the RSRP statistics of FIGS. 10 and 12, the decision threshold value is configured such that the relative probabilities of the (false critical; false non-critical) decisions are equalized. Since the statistics of FIGS. 10 and 12 are normalized distributions, the equalization can be performed such that the area (or numbers) of false critical decisions corresponds to the area (or numbers) of false non-critical decisions. In the example of FIG. 14, the new RSRP-related decision threshold will thus be set to a value of −113 dB. Depending on MNO preferences, a more sensitive analytics system 210 may be desired, in which case the probability ratio will not be equalized but the threshold is shifted towards the false critical cases. In a similar manner the threshold may be shifted towards the false non-critical cases in other cases.

While not specifically illustrated, a similar equalization scenario as shown in FIG. 14 for the RSRP parameter may be applied for the RSRQ statistics of FIGS. 11 and 13 to calculate a new RSRQ-related decision threshold. Evidently, other RCR parameters may be utilized in the scenario of FIG. 9, such as network throughput, an interference metrics, a cell congestion metrics, and similar KPIs.

Once a decision threshold value for the RCR parameter has been calculated in step 448, the threshold setting apparatus 215 sets the corresponding decision threshold in step 450 at the rule engine 214 (see FIG. 1). In some variants, this decision threshold will be applied in the context of all service types.

At this point, stage 440 has been completed and the optimization routine iteratively returns to stage 420 of FIG. 4 to again optimize the decision threshold setting for the SQR parameter as illustrated in FIG. 5, but applying in steps 424 and 426 (see also FIGS. 6 to 8) the decision threshold value(s) for the RCR parameter(s) as calculated in step 448. The iterations between stages 420 and 440 may be repeated until an abortion criterion is fulfilled (e.g., the respectively calculated threshold values remaining substantially constant from one iteration to the next iteration).

The rule engine 214 will then apply the corresponding thresholds calculated in stages 420 and 440 for a predetermined period of time. After the predetermined period of time, the optimization routine of FIG. 5 may be re-started.

An exemplary aggregated network analytics rule applied by the rule engine 214 and comprising multiple "elementary" network analytics rules (with associated thresholds) can be configured as follows:

1) Apply SQR rule for video service
   a. If average video MOS (in the last 1 min aggregation period, for a given logical entity such as session or subscriber in terms of, e.g., an international mobile subscriber identity)<3 (in a scale of 1-5) then analyze possible root cause via application of RCR rules
2) Apply RCR rules
   a. Number of handover failures (in the same time period, for the same logical entity, e.g., IMSI)>0? No, check next condition
   b. Is RSRP (in the same time period, for the same, e.g., IMSI)<−110 dBm? No, check next condition
   c. Is RSRQ (in the same time period, for the same, e.g., IMSI)<−15 dB? Yes, do not check further RCR rules, generate an incident message Reported incident: Service quality incident message with the following content: time, IMSI, video quality problem, MOS=2.5, possible root cause: interference (RSRQ=−18 dB)

In some variants, machine learning models may be utilized by the threshold setting apparatus 215 in the optimization steps 428 and 448 to minimize the occurrence of false critical and false non-critical decisions. The stages 420 and 440 may be performed in real-time for a "live" communication network domain 100 and based on real-time events.

In scenarios as described above, that involve a determining threshold, or boundary, for joint distributions of two marginal distributions one may use optimized binning techniques (e.g., Shimazaki and Shinomoto's choice) and/or the Jenks algorithm.

As for binning (see, e.g., FIGS. 6, 7 and 10 to 13), there generally is no "best" number of bins, and different bin sizes, or widths, can reveal different features of the underlying parameter values. Using wider bins where the density of the underlying data points is low reduces noise due to sampling randomness. Using narrower bins where the density is high (so the signal drowns the noise) gives greater precision to the density estimation. Thus, varying the bin size within a histogram can be beneficial. One of the possible approaches is Shimazaki and Shinomoto's choice. Assume a histogram that is generated via a function mi that counts the number of observations (data points) that fall into each of the disjoint categories (i.e., bins). Thus, if n is the total number of observations and k is the total number of bins, the histogram data mi meet the following conditions:

In Shimazaki and Shinomoto's algorithm the choice is based on minimization of an estimated $L^2$ risk function $$\arg\min_h \frac{2\overline{m} - v}{h^2},$$

where $\overline{m}$ and $v$ are mean and biased variances of a histogram with bin width h.

Jenks natural breaks classification method is one of the data clustering methods designed to determine the best arrangement of values into different classes (i.e., bins). So called "natural breaks" are the best way to split up ranges. Best ranges imply the ranges where like areas are grouped together. This method minimizes the variation within each range, so the areas within each range are as close as possible in value to each other (see FIGS. 8 and 14). Jenks natural breaks algorithm assigns data to one of K groups such that the within-group distances are minimized. Also just like K-means clustering algorithm, one must select K prior to running the algorithm.

A pseudocode of the Jenks algorithm can be formulated as follows:

1. Order $m_i$'s of the given histogram into a vector M = $[m_1, m_2, \ldots, m_k]$ 2. Calculate the mean of the bins $\overline{m} = \frac{1}{k}\sum_{i=1}^{k} m_i$ 3. Calculate the "sum of squared deviations for array mean" (SDAM)
   • $SDAM = \sum_{i=1}^{k} (m_i - \overline{m})^2$ 4. For each range combination, calculate "sum of squared deviations for class means" (SDCM_ALL), and find the smallest one. SDCM_ALL is similar to SDAM but uses class means and deviations
   • Let $z \leq n$ be the partitioning that defines $i_z$ the subsequences of $m_i$'s such that $\forall i_z, i_{z+1}$ all the elements are disjoint and $\forall x \in i_z$ and $\forall y \in i_{z+1}$ x < y
   • Lets denote now these subsequence clusters with $m_{i_z}$
   • In this case SDCM = $\min_z \sum_{i_z} \sum_j (m_j - \overline{m_{i_z}})^2$ -continued 5. As a final summary measure, calculate a "goodness of variance fit" (GVF), defined as (SDAM − SCDM) / SDAM. GVF ranges from 1 (perfect fit) to 0 (awful fit).

- $$GVF = \frac{SDAM - SDCM}{SDAM}$$

6. If GVF does not reach a target threshold increase n to n + 1

The above algorithms may be used individually or jointly for deriving the parameter statistics underlying the threshold setting technique presented herein.

In some variants, the one or more rules applied by the rule engine 214 are initially (e.g., upon system setup) configured to apply default decision threshold values. Such default decision threshold values may be defined by a network equipment vendor. The default decision threshold values are then optimized during operation of the communication network domain 100 of FIG. 1 as discussed above. This threshold optimization can thus take into account MNO-specific network settings and network conditions. The threshold optimization can be executed automatically and thus eliminates or reduces drive tests and laboratory measurements for rule development. Also a significant amount of manual work can thus be eliminated.

Advantageously, service quality-related incidents can efficiently be detected and analyzed, and this is done using per-session correlated information in some instances. Further, the SQR decision thresholds can individually be defined and optimized per service. Such an approach will help to make incident message generation by the rule engine 214 more reliable. Moreover, sensitivity of incident message generation can easily be adjusted by changing one or only a few parameters, such as the ratio of the probabilities of false critical and false non-critical decisions.

The invention claimed is:

1. A method of setting one or more decision thresholds of a network analytics system, wherein the analytics system is configured to analyze statistics pertaining to a service quality-related, SQR, parameter acquired for a communication network and statistics pertaining to a root cause-related, RCR, parameter acquired for the communication network, wherein the SQR parameter correlates with the RCR parameter, and wherein a first parameter is defined to be one of the SQR parameter and the RCR parameter and a second parameter is defined to be the other of the SQR parameter and the RCR parameter, the method comprising:

obtaining first statistics for the first parameter in situations in which the second parameter assumes critical second parameter values;

obtaining second statistics for the first parameter in situations in which the second parameter assumes non-critical second parameter values; and setting a first decision threshold of the analytics system based on an analysis of the first statistics and the second statistics, wherein the first decision threshold is defined to separate critical from non-critical first parameter values, wherein the critical second parameter values are separated from the non-critical second parameter values by one of a second decision threshold and a binary decision;

wherein for setting the first decision threshold, the first statistics and the second statistics are analyzed to derive at least one of the following two attribute sets:

false critical; false non-critical and true non-critical; true critical, with a primary attribute critical or non-critical being associated with first decisions for the first parameter values, and a secondary attribute true or false being associated with second decisions for the second parameter values dependent on whether or not the respectively associated first decision can be confirmed;

wherein the first decision threshold is set to configure at least one of a. relative probabilities or a ratio of false critical; false non-critical decisions; and b. relative probabilities or a ratio of true critical; true non-critical decisions; and wherein the first decision threshold is set to equalize, based on the first statistics and the second statistics, one of a. the probabilities or numbers of false critical and false non-critical decisions; and b. the probabilities or numbers of true critical and true non-critical decisions.

2. The method of claim 1, wherein at least one of the first statistics and the second statistics takes the form of a parameter value distribution, at least one of the RCR parameter and the SQR parameter assumes continuous parameter values, and an associated parameter value distribution is obtained by applying a discretization operation to the continuous parameter values.

3. The method of claim 1, wherein at least one of the RCR parameter and the SQR parameter is a key performance indicator, KPI, pertaining to the communication network.

4. The method of claim 1, wherein the SQR parameter is derived from, or indicative of, at least one of one or more events or counters relating to a user plane of a core domain of the communication network; and the RCR parameter is derived from, or indicative of, at least one of:

a. one or more radio environment measurements;

b. one or radio signalling events; and c. one or more events or counters relating to a core domain of the communication network.

5. The method of claim 1, wherein the SQR parameter correlates with the RCR parameter in that a possible root cause as indicated by a critical RCR parameter value potentially leads to a service quality degradation as indicated by a critical SQR parameter value.

6. The method of claim 1, wherein the first parameter is the SQR parameter and the second parameter is the RCR parameter.

7. The method of claim 6, wherein the first statistics are obtained for a dedicated service out of a set of services supported by the communication network; and a dedicated first threshold is set for each of two or more dedicated services out of the set of services.

8. The method of claim 1, further comprising:

obtaining third statistics for the second parameter in situations in which the first parameter assumes critical first parameter values;

obtaining fourth statistics for the second parameter in situations in which the first parameter assumes non-critical first parameter values; and setting the second decision threshold based on the third statistics and the fourth statistics.

9. The method of claim 8, wherein for setting the second decision threshold, the third statistics and the fourth statistics are analyzed to derive at least one of the following two attribute sets:

false critical; false non-critical and true non-critical; true critical, with a primary attribute critical or non-critical being associated with second decisions for the second parameter values, and a secondary attribute true or false being associated with first decisions for the first parameter values dependent on whether or not the respectively associated second decision can be confirmed.

10. The method of claim 9, wherein the second decision threshold is set to configure at least one of a. relative probabilities or a ratio of false critical; false non-critical decisions; and b. relative probabilities or a ratio of true critical; true non-critical decisions.

11. The method of claim 10, wherein the second decision threshold is set to equalize, based on the first statistics and the second statistics, one of a. the probabilities or numbers of false critical and false non-critical decisions; and b. the probabilities or numbers of true critical and true non-critical decisions.

12. The method of claim 8, wherein setting of the first decision threshold and setting of the second decision threshold are iteratively repeated.

13. The method of claim 1, comprising detecting, based on one or more critical values of the SQR parameter, a service quality degradation;

performing, in response to detection of the service quality degradation, a root cause analysis based on one or more of the RCR parameter values; and determining, based on one or more critical values of the RCR parameter, a possible root cause.

14. The method of claim 1, wherein the analytics system is rule-based, and wherein the first decision threshold belongs to a first network analytics rule configured to detect the service quality degradation.

15. A non-transitory computer-readable medium storing instructions thereon that when executed by one or more processors cause a computer to perform the method of claim 1.

16. The method of claim 1, wherein the first decision threshold is set to equalize, based on the first statistics and the second statistics, the probabilities of false critical and false non-critical decisions.

17. The method of claim 1, wherein the first decision threshold is set to equalize, based on the first statistics and the second statistics, the numbers of false critical and false non-critical decisions.

18. The method of claim 1, wherein the first decision threshold is set to equalize, based on the first statistics and the second statistics, the probabilities of true critical and true non-critical decisions.

19. The method of claim 1, wherein the first decision threshold is set to equalize, based on the first statistics and the second statistics, the numbers of true critical and true non-critical decisions.

* * * * *